United States Patent
Handa et al.

(10) Patent No.: US 12,203,761 B2
(45) Date of Patent: Jan. 21, 2025

(54) VEHICLE OPERATION ASSISTANCE DEVICE AND VEHICLE OPERATION ASSISTANCE METHOD

(71) Applicant: Hitachi, Ltd., Tokyo (JP)

(72) Inventors: Takeshi Handa, Tokyo (JP); Ryota Uematsu, Tokyo (JP); Takashi Wakamiya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 86 days.

(21) Appl. No.: 17/641,543

(22) PCT Filed: Aug. 26, 2020

(86) PCT No.: PCT/JP2020/032181
§ 371 (c)(1),
(2) Date: Mar. 9, 2022

(87) PCT Pub. No.: WO2021/166287
PCT Pub. Date: Aug. 26, 2021

(65) Prior Publication Data
US 2022/0326026 A1 Oct. 13, 2022

(30) Foreign Application Priority Data
Feb. 20, 2020 (JP) .................. 2020-026992

(51) Int. Cl.
*G01C 21/34* (2006.01)
*G06Q 50/40* (2024.01)
(52) U.S. Cl.
CPC ......... *G01C 21/3453* (2013.01); *G06Q 50/40* (2024.01)
(58) Field of Classification Search
CPC .... G01C 21/3453; G01C 21/20; G06Q 50/30; G06Q 50/10; B61L 27/00
See application file for complete search history.

(56) References Cited

U.S. PATENT DOCUMENTS 7,200,587 B2 *  4/2007  Matsubayashi ..... G06F 16/3347
                                                707/E17.08
8,238,617 B2 *  8/2012  Omoto ................... B60R 25/25
                                                701/1
(Continued)

FOREIGN PATENT DOCUMENTS

EP      3 171 304 A1    5/2017
EP      3 960 581 A1    3/2022
(Continued)

OTHER PUBLICATIONS

International Search Report (PCT/ISA/210) issued in PCT Application No. PCT/JP2020/032181 dated Dec. 1, 2020 with English translation (four (4) pages).
(Continued)

*Primary Examiner* — Kira Nguyen
(74) *Attorney, Agent, or Firm* — Crowell & Moring LLP

(57) ABSTRACT

The present invention assists at work related to the setting of an evaluation index for a vehicle operation plan. A vehicle operation assistance device manages one or more pieces of evaluation information including information regarding evaluation of the vehicle operation plan, acquires setting target information that is information regarding evaluation, the information being intended to be set for the vehicle operation plan by a user, derives a similarity degree between the setting target information and each pieces of the evaluation information, extracts evaluation information on the basis of the similarity degree, receives a setting for information regarding evaluation related to the vehicle operation plan from the user while presenting similar evaluation information which is the extracted evaluation information to the user and generates evaluation information on the basis of a received content. The vehicle operation assistance device provides a user interface for visually presenting a method for
(Continued)

calculating an evaluation index included in the similar evaluation information, in a state in which the user can edit the method.

11 Claims, 6 Drawing Sheets

(56) References Cited

U.S. PATENT DOCUMENTS

| | | | |
|---|---|---|---|
| 10,962,371 B2* | 3/2021 | Bush | G06T 7/292 |
| 2016/0267417 A1 | 9/2016 | Tomiyama et al. | |
| 2018/0060356 A1* | 3/2018 | Watanabe | G06F 16/5838 |
| 2018/0082344 A1* | 3/2018 | Sugawara | G06Q 50/14 |
| 2018/0164110 A1* | 6/2018 | Shirai | G01C 21/20 |
| 2021/0003399 A1* | 1/2021 | Dobashi | G07C 5/006 |

FOREIGN PATENT DOCUMENTS

| | | |
|---|---|---|
| JP | 6-92237 A | 4/1994 |
| JP | 2011-5881 A | 1/2011 |
| JP | 2014-210530 A | 11/2014 |
| WO | WO 2015/068231 A1 | 5/2015 |
| WO | WO 2017/119094 A1 | 7/2017 |

OTHER PUBLICATIONS

Japanese-language Written Opinion (PCT/ISA/237) issued in PCT Application No. PCT/JP2020/032181 dated Dec. 1, 2020 (four (4) pages).
Extended European Search Report issued in European Application No. 20919664.1 dated Feb. 20, 2024 (13 pages).

* cited by examiner

FIG. 6

REGISTERED EVALUATION INFORMATION TBL 111

| EVALUATION INDEX NAME | CATEGORY | EVALUATION INDEX CALCULATION INFORMATION | | | BASIC LOGIC |
|---|---|---|---|---|---|
| | | OBJECT (What) | TIME (When) | LOCATION (Where) | |
| NUMBER OF TRAINS | TRANSPORT SERVICE | ·PRE-CHANGE TRAIN TIMETABLE ·POST-CHANGE TRAIN TIMETABLE | ·USER-SPECIFIED RANGE | ·ALL STATIONS | ·DEVIATION CALCULATION ·COUNT OF NUMBER OF TRAINS |
| CUMULATIVE TRAVEL DISTANCE OF ALL VEHICLES | VEHICLE MAINTENANCE | ·PRE-CHANGE VEHICLE MANAGEMENT INFORMATION ·POST-CHANGE VEHICLE MANAGEMENT INFORMATION | ·USER-SPECIFIED RANGE | — | ·DEVIATION CALCULATION ·COUNT OF NUMBER OF VEHICLES ·KILOMETRAGE CALCULATION |
| TRACK OCCUPANCY RATE OF BASE | VEHICLE MAINTENANCE | ·PRE-CHANGE YARD SWITCHING PLAN ·POST-CHANGE YARD SWITCHING PLAN | ·USER-SPECIFIED RANGE | ·ALL YARD TRACKS | ·DEVIATION CALCULATION ·TRAIN STOP TIME CALCULATION |

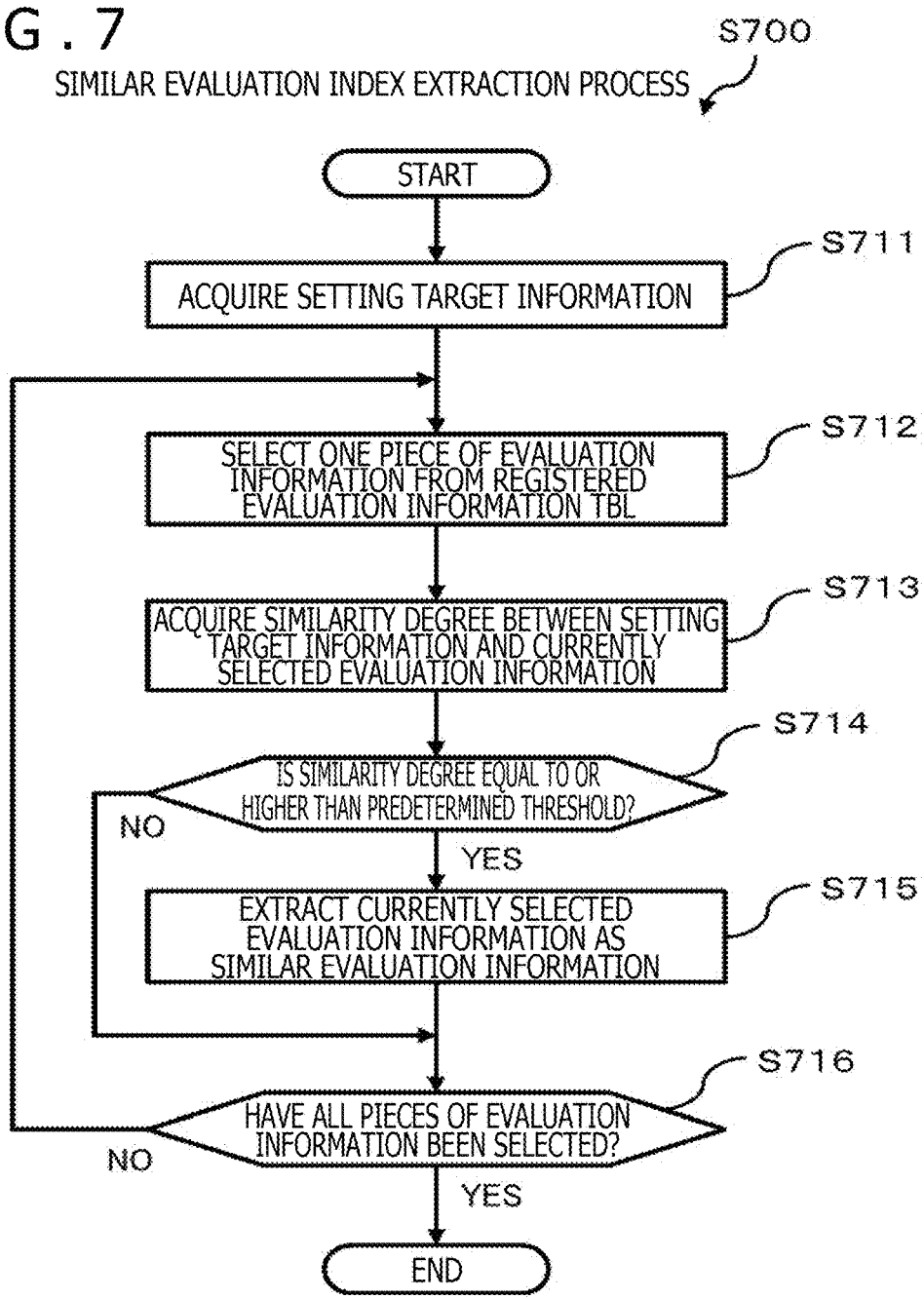

VEHICLE OPERATION ASSISTANCE DEVICE AND VEHICLE OPERATION ASSISTANCE METHOD

TECHNICAL FIELD

The present invention relates to a vehicle operation assistance device and a vehicle operation assistance method.

BACKGROUND ART

This application claims priority based on Japanese Patent Application No. 2020-026992 filed on Feb. 20, 2020, and the entire disclosure of which is hereby incorporated by reference.

Patent Document 1 describes a timetable correction plan generation system configured for the purpose of suppressing personality regarding previous evaluation of train timetables and correction work based on the evaluation, and efficiently generating timetable correction plans with excellent quality. The timetable correction plan generation system executes a train operation simulation based on the current train operation information, checks the data included in the execution result of the simulation with a predetermined standard, identifies an evaluation score related to the train operation, selects any one of the correction contents corresponding to the correction policy from the correction pattern table when the evaluation score does not meet the achievement condition after checking the evaluation score with an achievement condition, and then corrects the timetable information with the corresponding correction contents to generate a timetable correction plan candidate, executes a train operation simulation with the train operation information composed of the timetable correction plan candidate, executes each of processes of identifying the evaluation score and checking the evaluation score with the achievement condition, and transmits the timetable correction plan candidate to the management device or the like as the timetable correction plan when the evaluation score reaches the achievement condition.

PRIOR ART DOCUMENT

Patent Document

Patent Document 1: JP-2014-210530-A

SUMMARY OF THE INVENTION

Problem to be Solved by the Invention

In the vehicle operation work in railway transportation, for the planned train timetable, the vehicles that are actually operated are allocated to the trains. In addition, when train operation is rearranged due to a vehicle failure, accident, disaster, etc., a vehicle operation plan is formulated such that the train can be operated according to the adjusted train timetable while the vehicle operation plan from the next day onward, the need for regular inspections, the existence of surplus vehicles in the vehicle depot, or the like are comprehensively considered. In addition, changes to train timetables and vehicle operation plans are made as needed for the purpose of responding to changes in the business environment, such as an increase in mutual through service operations and an increase in vehicle bases.

Incidentally, when the vehicle operation plan is changed, the vehicle operation plan after the change is evaluated previously based on the preset evaluation index, but when the calculation method of the evaluation index of the changed vehicle operation plan needs to be customized or needs a new setting of an evaluation index, enormous labor and cost will be required to modify the system.

In the above-mentioned Patent Document 1, after evaluating the delay probability, boarding rate, fare income, vehicle maintenance cost, crew manpower cost, etc. in advance, the vehicle operation plan, crew operation plan, and train timetable amendment plan are generated. However, the technology for easily changing and adding the items of the evaluation index and the calculation method according to the request of the service operator who is the user is not particularly disclosed.

The present invention has been made in view of such a background, and an object of the present invention is to provide a vehicle operation assistance device and a vehicle operation assistance method that assist at work related to the setting of an evaluation index of a vehicle operation plan.

Means for Solving the Problem

One aspect of the present invention for achieving the above object is a vehicle operation assistance device which is configured by using an information processing device. The vehicle operation assistance device includes an evaluation information management section that manages one or more pieces of evaluation information including information regarding evaluation of a vehicle operation plan, a setting target information acquiring section that acquires setting target information that is information regarding evaluation, the information being intended to be set for the vehicle operation plan by a user, a similarity degree calculating section that derives a similarity degree between the setting target information and each of the one or more pieces of evaluation information, a similar evaluation information extracting section that extracts the evaluation information on the basis of the similarity degree, and an evaluation information generating section that receives a setting of information regarding the evaluation of the vehicle operation plan from the user while presenting similar evaluation information that is the extracted evaluation information to the user, and generates evaluation information based on a received content.

In addition, the problem disclosed in the present application and the solution thereof will be clarified by the section of Modes for Carrying Out the Invention and the drawings.

Advantage of the Invention

According to the present invention, it is possible to assist at the work related to the setting of the evaluation index of the vehicle operation plan.

BRIEF DESCRIPTION OF THE DRAWINGS

FIG. 6 illustrates an example of registered evaluation information TBL.

FIG. 7 is a flowchart illustrating a similar evaluation index extraction process.

FIG. 8 illustrates an example of similarity degree calculation weighting TBL.

MODES FOR CARRYING OUT THE INVENTION

Figure 1:
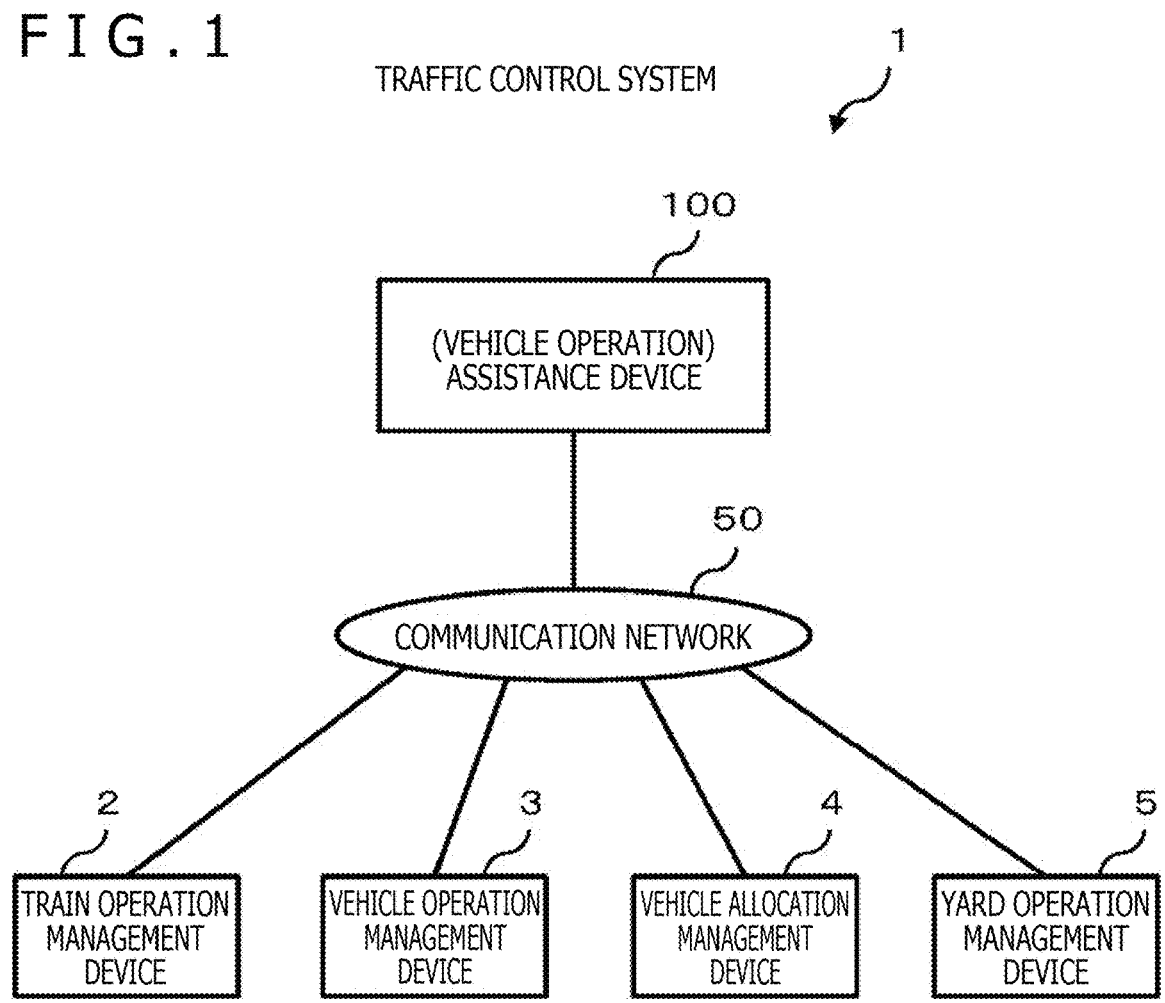
FIG. 1 is a diagram illustrating a schematic configuration of a traffic control system.

Hereinafter, embodiments will be described with reference to the drawings. In the following description, the same or similar configurations may be designated by the same reference characters to omit duplicate description. Further, in the following description, a "table" is referred to as "TBL" in some cases. In addition, a user interface is referred to as a "UI" in some cases.

FIG. 1 illustrates a schematic configuration of an information processing system (hereinafter, referred to as a "traffic control system 1.") described as an embodiment. As illustrated in FIG. 1, the traffic control system 1 includes a train operation management device 2, a vehicle operation management device 3, a vehicle allocation management device 4, a yard operation management device 5, and a vehicle operation assistance device (hereinafter, referred to as an "assistance device 100."). All of these are each configured by using an information processing device (computer). Further, these devices are connected to each other in such a manner as to be communicable via a communication network 50. The communication network 50 is wired or wireless communication means, and is, for example, a LAN (Local Area Network), a WAN (Wide Area Network), the Internet, a dedicated line, or a public communication network.

The train operation management device 2 performs information processing related to planning (creating) and managing train timetables, automatic route control according to train timetables, train tracking, transportation plan management, etc., in order to efficiently operate trains which are present in the section of tracks. Examples of the above information processing are planning of a train timetable, simulation of the planned train timetable, and the like. The train operation management device 2 appropriately cooperates with a train centralized control device (CTC: Centralized Traffic Control) and a train operation management system (PTC: Programmed Traffic Control) when executing the above information processing. Further, the train operation management device 2 performs information processing related to the operation arrangement function, the provision of operation information, and the like in order to ensure the accuracy of the operation command work and improve the passenger service.

The vehicle operation management device 3 performs information processing related to the setting of a route (operation) (combination of a series of trains operated by the same train formation or crew) and a work shift (allocation order of each train formation or crew to the route) regarding the train timetable planned by the train operation management device 2. The information processing includes, for example, planning of a vehicle operation, simulation of the planned vehicle operation, and the like.

The vehicle allocation management device 4 performs information processing regarding the allocation (appropriation) of vehicles (physical vehicles and physical formation) to the route set by the vehicle operation management device 3. Examples of the above information processing are planning of a vehicle allocation, simulation of a planned vehicle allocation, and the like.

The yard operation management device 5 performs information processing relates to planning and management of yard operation (track switching, train connection-disconnection, locomotive switching of locomotive traction train, a vehicle inspection, vehicle cleaning, etc. in a station yard and a vehicle base yard). The above-mentioned information processing is planning a yard operation, simulating a planned yard operation, and the like, for example.

The assistance device 100 performs information processing to assist in user's work related to the setting of information for evaluating the vehicle operation plan (hereinafter, referred to as "evaluation information.") at the time of formulating the vehicle operation plan. The above-mentioned evaluation information includes, for example, information regarding an index used for evaluation (hereinafter referred to as an "evaluation index."), regarding a calculation method of the evaluation index, and the like. Incidentally, in the present embodiment, one piece of evaluation information includes information of one evaluation index. An example of the evaluation index is a KPI (Key Performance Indicator). The evaluation index is derived based on the information acquired by performing a simulation of at least any one of the train timetable plan, the vehicle operation plan, the vehicle allocation plan, and the yard operation plan, for example.

The assistance device 100 provides a user with an editing assistance function for a registered evaluation index (hereinafter referred to as "registered evaluation information."), a registration assistance function for a new evaluation index using the registered evaluation information, and the like. The assistance device 100 performs the above information processing while appropriately cooperating with other information processing devices (the train operation management device 2, the vehicle operation management device 3, the vehicle allocation management device 4, and the yard operation management device 5).

Figure 2:
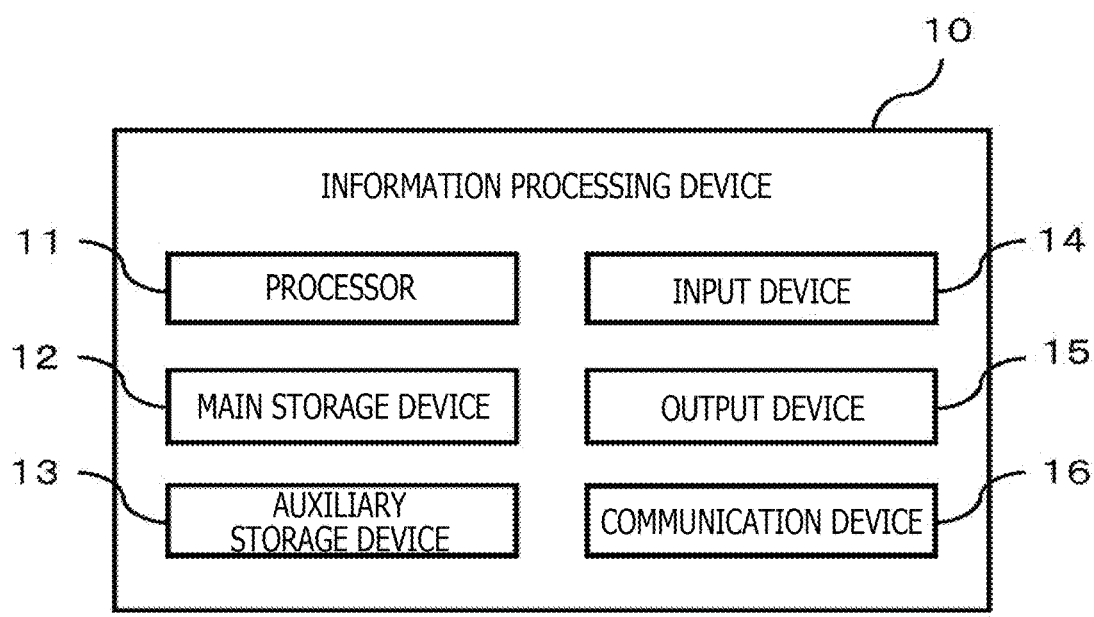
FIG. 2 is a block diagram illustrating an example of an information processing device constituting the traffic control system.

FIG. 2 illustrates an example of an information processing device 10 (computer) used for respective configurations of the train operation management device 2, the vehicle operation management device 3, the vehicle allocation management device 4, the yard operation management device 5, and the assistance device 100. As illustrated in FIG. 2, the illustrated information processing device 10 includes a processor 11, a main storage device 12, an auxiliary storage device 13, an input device 14, an output device 15, and a communication device 16. These are connected to each other in such a manner as to be communicable via a communication device such as a bus.

The information processing device 10 is a personal computer, an office server, or a mainframe, for example. The information processing device 10 may be achieved with use of virtual information processing resources provided by using virtualization technology or by using process space separation technology, like a virtual server provided by a cloud system, for example. All or some of the functions provided by the information processing device 10 may be fulfilled by a service provided by a cloud system via an API (Application Programming Interface), for example. Software such as an operating system, a file system, and a DBMS (DataBase Management System) (a relational database, NoSQL, etc.) may be installed in the information processing device 10.

The processor 11 is configured by using a CPU (Central Processing Unit), an MPU (Micro Processing Unit), a GPU (Graphics Processing Unit), an AI (Artificial Intelligence) chip, an FPGA (Field Programmable Gate Array), an ASIC (Application Specific Integrated Circuit), or the like, for example.

The main storage device 12 is a device for storing programs and data, and is a ROM (Read Only Memory), a RAM (Random Access Memory), a non-volatile memory (NVRAM (Non Volatile RAM)), or the like, for example.

The auxiliary storage device 13 includes an SSD (Solid State Drive), a hard disc drive, an optical storage device (CD (Compact Disc), DVD (Digital Versatile Disc), etc.), a storage system, a reading/writing device for a recording medium such as an IC card, an SD card, or an optical recording medium, a storage area for a virtual server, and the like, for example. The auxiliary storage device 13 can write/read programs or data via the reading device of the recording medium or the communication device 16. Programs or data stored in the auxiliary storage device 13 is read out to the main storage device 12 as needed.

The input device 14 is an interface that accepts input from the outside, and is a keyboard, a mouse, a touch panel, a card reader, a voice input device, or the like, for example. The output device 15 is an interface that outputs various kinds of information such as a processing progress and processing results.

The output device 15 is a display device (a liquid crystal monitor, an LCD (Liquid Crystal Display), a projector, etc.) that visualizes the various kinds of information mentioned above, a device that converts the various kinds of information mentioned above into voice (voice output device (speaker, etc.)), or a device that converts the various kinds of information mentioned above into characters (printing device, etc.), for example.

The input device 14 and the output device 15 constitute a user interface. For example, the information processing device 10 may be configured to input/output information to/from another device (a smartphone, a tablet, a notebook computer, various portable information terminals, etc.) via the communication device 16.

The communication device 16 realizes communication with other devices. The communication device 16 is a wireless or wired communication interface that realizes communication with other devices via the communication network 50, and is, for example, a NIC (Network Interface Card), a wireless communication module, a USB (Universal Serial Bus) module, or the like.

Figure 3:
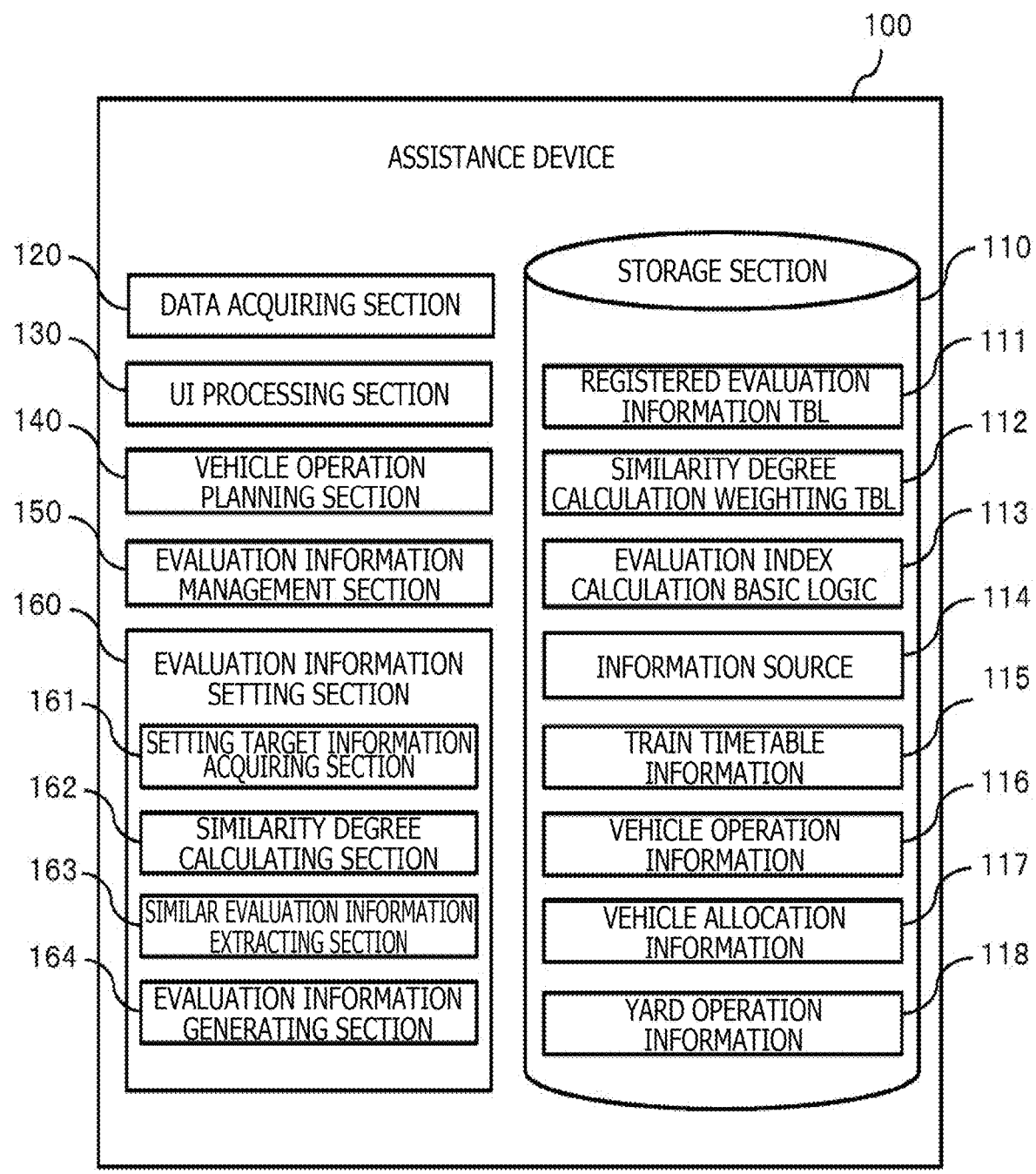
FIG. 3 is a diagram illustrating main functions of an assistance device (vehicle operation assistance device).

FIG. 3 illustrates main functions of the assistance device 100. The assistance device 100 includes functions of a storage section 110, a data acquiring section 120, a UI processing section 130, a vehicle operation planning section 140, an evaluation information management section 150, and an evaluation information setting section 160. Among the above functions, the evaluation information setting section 160 includes a setting target information acquiring section 161, a similarity degree calculating section 162, a similar evaluation information extracting section 163, and an evaluation information generating section 164. Each function illustrated in FIG. 3 is achieved by the processor 11 of the information processing device 10 constituting the assistance device 100, the processor 11 reading and executing a program stored in the main storage device 12 of the information processing device 10 or achieved by the hardware (an FPGA, an ASIC, an AI chip, etc.) included in the information processing device 10.

The storage section 110 stores pieces of information (data) such as a registered evaluation information TBL 111, a similarity degree calculation weighting TBL 112, an evaluation index calculation basic logic 113, an information source 114, train timetable information 115, vehicle operation information 116, vehicle allocation information 117, and yard operation information 118. The storage section 110 stores data as a database table provided by a DBMS or a file provided by the file system, for example.

The registered evaluation information TBL 111 includes information regarding evaluation information which has been registered (hereinafter, referred to as "registered evaluation information."). The similarity degree calculation weighting TBL 112 includes information regarding weight used in the calculation of the similarity degree carried out at the time of searching for a registered evaluation index similar to the evaluation index that the user intends to newly register. The evaluation index calculation basic logic 113 includes information regarding a basic logic (hereinafter, referred to as the "basic logic.") used at the time of setting the evaluation index calculation method. The basic logic is expressed as a flowchart, a mathematical expression, an algorithm (program), or the like, for example. The information source 114 includes information regarding the substance of various kinds of information used at the time of setting the calculation method of the evaluation index, regarding the location of the various kinds of information mentioned above (which information processing device constituting the traffic control system 1 manages the information, or the like), or the like.

The train timetable information 115 includes information regarding the train timetable, the information being acquired from the train operation management device 2. The vehicle operation information 116 includes information regarding vehicle operation, the information being acquired from the vehicle operation management device 3. The vehicle allocation information 117 includes information regarding the allocation of vehicles to the routes, the information being acquired from the vehicle allocation management device 4. The yard operation information 118 includes information regarding a plan and management related to the yard switching operation, the information being acquired from the yard operation management device 5.

The data acquiring section 120 illustrated in FIG. 3 acquires (receives) the train timetable information 115 from the train operation management device 2, the vehicle operation information 116 from the vehicle operation management device 3, the vehicle allocation information 117 from the vehicle allocation management device 4, and the yard operation information 118 from the yard operation management device 5, via the communication network 50.

The UI processing section 130 provides a user interface that realizes dialogue processing with the user by controlling the input device 14 or the output device 15. The UI processing section 130 performs information processing such as output of various kinds of information and reception of information from the user.

The vehicle operation planning section 140 performs information processing regarding formulation of the vehicle operation plan. The vehicle operation planning section 140 provides the user with an editing environment for the vehicle operation plan via the UI processing section 130, for example. The vehicle operation planning section 140 updates various kinds of information (the train timetable, the vehicle operation plan, the vehicle allocation plan, the yard switching plan, etc.) managed by the traffic control system 1, on the basis of a content of the formulated vehicle operation plan.

The evaluation information management section 150 manages, in the registered evaluation information TBL 111, the evaluation information set in the past.

The evaluation information setting section 160 performs information processing regarding setting (new registration, editing, etc.) of evaluation information.

The setting target information acquiring section 161 acquires the setting target information which is information regarding the evaluation index, the information being intended to be set by the user, via the UI processing section 130.

The similarity degree calculating section 162 derives the similarity degree between the setting target information and each piece of the evaluation information managed in the registered evaluation information TBL 111. Note that, in this embodiment, as the similarity degree value is larger, the similarity is higher.

The similar evaluation information extracting section 163 extracts evaluation information having a similarity degree equal to or higher than a preset threshold value (hereinafter, referred to as "similar evaluation information.") from the registered evaluation information TBL 111. Incidentally, the above threshold value is set by the user via the UI processing section 130, for example.

The evaluation information generating section 164 receives settings related to the evaluation index, the settings being intended to be made by the user, while presenting the extracted evaluation information to the user via the UI processing section 130, and generates evaluation information on the basis of a received content (newly generates evaluation information or updates existing evaluation information).

Next, the details of the function of the assistance device 100 will be specifically described.

Figure 4:
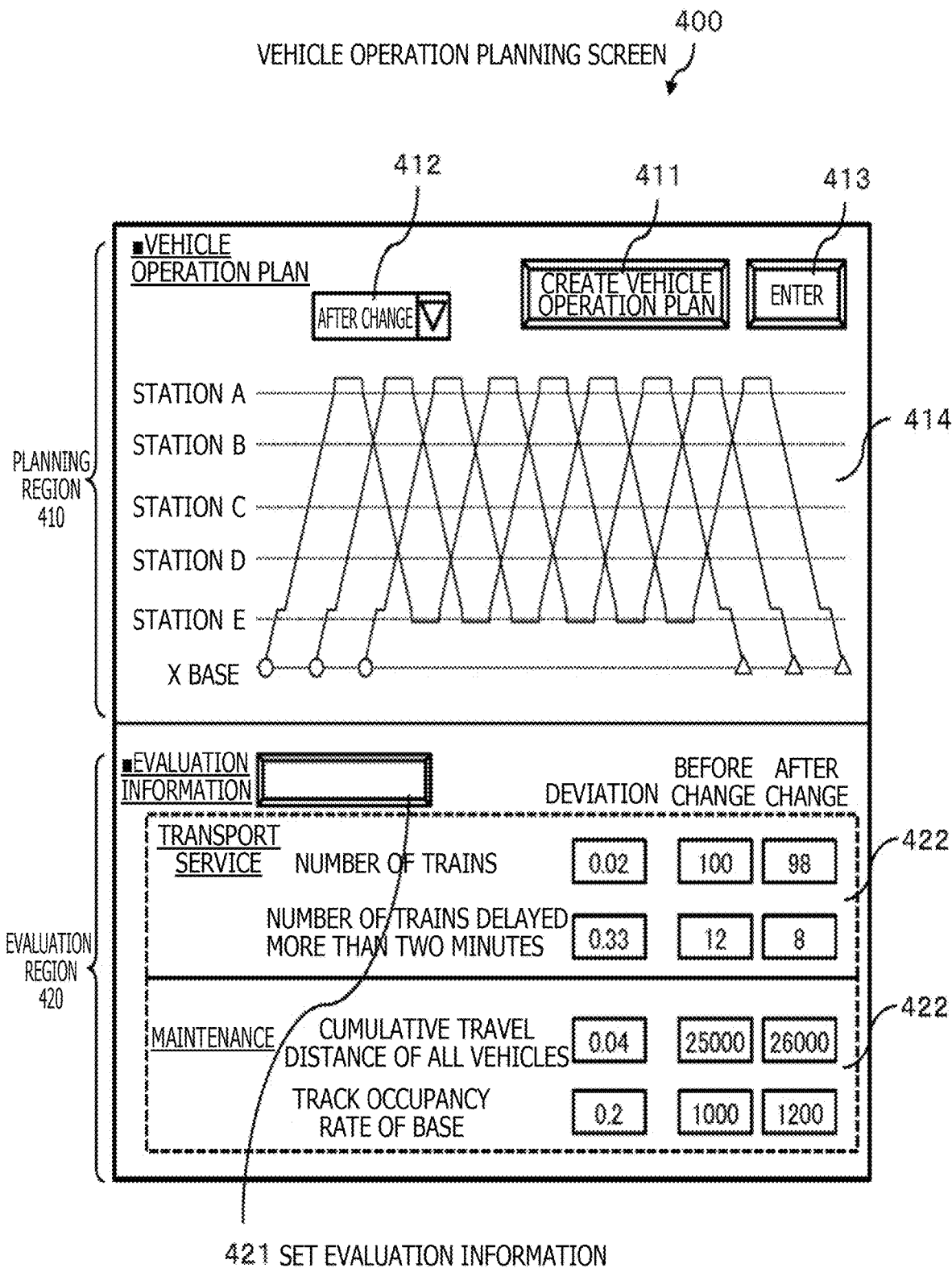
FIG. 4 illustrates an example of a vehicle operation planning screen.

FIG. 4 is an example of a screen which the vehicle operation planning section 140 of the assistance device 100 presents to the user when formulating the vehicle operation plan (hereinafter referred to as a "vehicle operation planning screen 400."). The vehicle operation planning screen 400 includes a region related to the setting of a vehicle operation plan and provided in the upper part of the screen (hereinafter referred to as a "planning region 410.") and a region in which settings related to the evaluation of the vehicle operation plan formulated by the user and evaluation results are displayed and which is provided in the lower part of the screen (hereinafter referred to as an "evaluation region 420.").

As illustrated in FIG. 4, the planning region 410 includes a vehicle operation plan creation button 411, a display content switching button 412, an enter button 413, and an operation plan display field 414. On the other hand, the evaluation region 420 includes an evaluation information setting button 421 and an evaluation result display field 422.

When the user operates the vehicle operation plan creation button 411 in the planning region 410, the vehicle operation planning section 140 displays a screen (not illustrated) for setting the vehicle operation plan. When the user sets the vehicle operation plan via the above-mentioned screen, the vehicle operation planning section 140 displays a set content (train timetable in FIG. 4) in the operation plan display field 414. By operating the display content switching button 412, the user can switch the display content in the operation plan display field 414 to either the current vehicle operation plan or a newly set vehicle operation plan.

In the evaluation region 420, information regarding the evaluation of the vehicle operation plan which is set by the user in the planning region 410 (information regarding the value of the evaluation index before and after the change of the vehicle operation plan, information regarding the deviation (difference) of the evaluation index before and after the change, or the like) is displayed for each evaluation index (evaluation information). The user can set the evaluation information (new registration, editing, etc.) by operating the evaluation information setting button 421 in the region.

Figure 5:
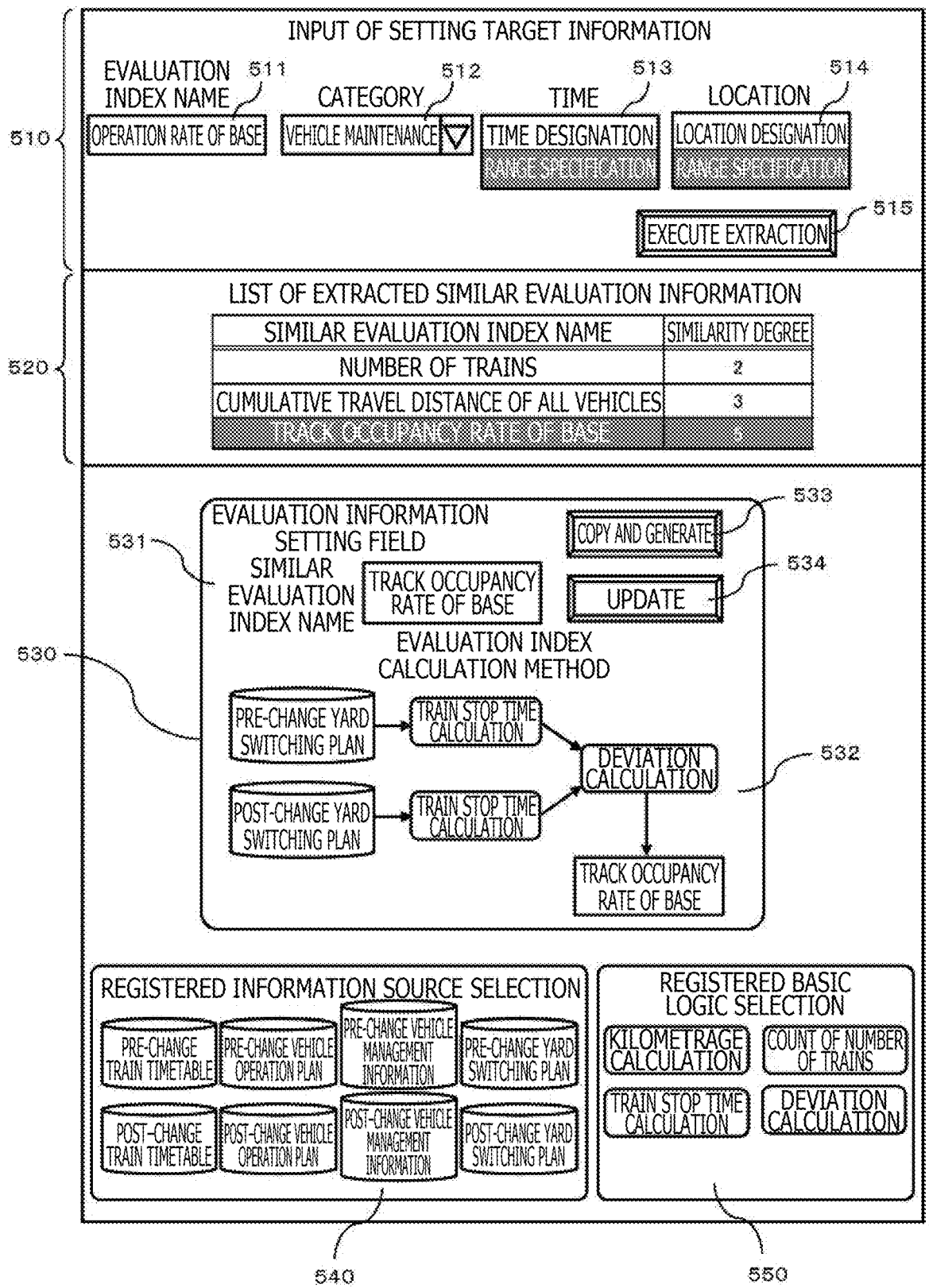
FIG. 5 illustrates an example of an evaluation index setting screen.

FIG. 5 illustrates an example of a screen displayed by the assistance device 100 when the user operates the evaluation information setting button 421 (hereinafter, referred to as an "evaluation index setting screen 500."). The evaluation index setting screen 500 includes a setting target information input field 510, a similar evaluation information list 520, an evaluation information setting field 530, an information source selection field 540, and a basic logic selection field 550.

The setting target information input field 510 is provided with an evaluation index name setting field 511, a category setting field 512, a time designation field 513, a location designation field 514, and an extraction executing button 515. The setting target information acquiring section 161 acquires the setting target information from the user via the setting target information input field 510.

In the evaluation index name setting field 511, the name of the evaluation index ("number of trains," "cumulative travel distance of all vehicles," "track occupancy rate of base," etc. Hereinafter referred to as an "evaluation index name.") is set. In the category setting field 512, the name of the category ("transport service," "vehicle maintenance," etc.) to which the evaluation index belongs (hereinafter, referred to as a "category name.") is set. The user sets time to be evaluated by the evaluation index via the time designation field 513. The user can set the time directly in the time designation field 513 or can set a period. The user sets a location to be evaluated by the evaluation index via the location designation field 514. The user can set a specific location in the location designation field 514, or can set a range (area).

When the user operates the extraction executing button 515, the similarity degree calculating section 162 acquires the degree of similarity between the setting target information (evaluation index name, category name, time, location) set in the setting target information input field 510 and each piece of evaluation information managed in the registered evaluation information TBL 111. Next, the similar evaluation information extracting section 163 extracts, from the registered evaluation information TBL 111, evaluation information (similar evaluation information) whose similarity degree is equal to or higher than a preset threshold value, and displays the extracted similar evaluation information in the similar evaluation information list 520. Incidentally, the details of the similarity degree calculation method will be described later.

In the similar evaluation information list 520, the name of the similar evaluation index of the similar evaluation information (hereinafter, referred to as a "similar evaluation index name.") and the degree of similarity calculated for the similar evaluation information are displayed. The user selects the similar evaluation information to be used when setting the evaluation information while referring to the displayed similarity degree. The evaluation information generating section 164 acquires, from the registered evaluation information TBL 111, a similar evaluation index selected by the user from the similar evaluation information list 520, and displays the acquired content in the evaluation information setting field 530.

The evaluation information setting field 530 is provided with a display field 531 for a similar evaluation index name, an evaluation method editing field 532 for an evaluation method, a copy-and-generate button 533, and an update button 534. Among those, in the display field 531 for the similar evaluation index name, the similar evaluation index name of the similar evaluation index of the similar evaluation information selected by the user from the similar evaluation information list 520 is displayed. In the edit field 532 for the evaluation method, the calculation method of the evaluation index included in the similar evaluation information selected by the user is displayed as a default. The user can efficiently edit the calculation method of the evaluation index due to the visual editing environment using the edit field 532 for the evaluation method.

For example, the user can easily use the selected information source as a component for defining a calculation method of the evaluation index, by selecting any one of the information sources (an image or a character string corresponding to each information source) from the information source selection field 540 and dragging and dropping the information source into the edit field 532 for the evaluation method. In the case of the present example, in the information source selection field 540, respective information sources of "pre-change train timetable," "post-change train timetable," "pre-change vehicle operation plan," "post-change vehicle operation plan," "pre-change vehicle management information," "post-change vehicle management information," "pre-change yard switching plan," and "post-change yard switching plan" are displayed. The information source to be displayed in such a manner as to be selectable in the information source selection field 540 can be set by the user, for example, via the UI processing section 130. Further, the above information source may be acquired from another information processing device constituting the traffic control system 1.

Further, for example, the user can easily use a selected basic logic as a component for defining the calculation method of the evaluation index, by selecting the basic logic (an image or a character string corresponding to each basic logic) from the basic logic selection field 550 and dragging and dropping the logic into the edit field 532 for the evaluation method. In the case of the present example, basic logic of "kilometrage calculation," "stop time calculation," "count of number of trains," and "deviation calculation" or the like can be used in the basic logic selection field 550 by dragging and dropping. The basic logic to be displayed in such a manner as to be selectable in the basic logic selection field 550 can be set by the user via the UI processing section 130, for example.

In the example illustrated in FIG. 5, in the edit field 532 for the evaluation method, a calculation method of the evaluation index is set in which the information sources "pre-change yard switching plan" and "post-change yard switching plan" are individually input into the basic logic "train stop time calculation," and then, the processing result of each basic logic is input to the further another basic logic "deviation calculation" to derive the value of the evaluation index "base track occupancy rate."

When the user operates the copy-and-generate button 533 provided in the evaluation information setting field 530, the evaluation information generating section 164 newly generates the evaluation information of the content set in the edit field 532 for the evaluation method, the evaluation index name set in the evaluation index name setting field 511 being the evaluation index name of the newly generated evaluation information, and registers the generated evaluation information in the registered evaluation information TBL 111.

Further, when the user operates the update button 534 provided in the evaluation information setting field 530, the evaluation information generating section 164 updates the registered evaluation information TBL 111 such that the similar evaluation information of the similar evaluation index set in the display field 531 for the similar evaluation index name becomes the content set in the edit field 532 for the evaluation method.

In this way, the user can efficiently set new evaluation information by using the evaluation information of the evaluation index already registered. Further, the user can intuitively and efficiently perform new registration of evaluation information and editing of already registered evaluation information, by using a visual editing environment via the edit field 532 for the evaluation method.

FIG. 6 illustrates an example of the registered evaluation information TBL 111. The registered evaluation information TBL 111 includes one or more entries (records) having each of items, namely, an evaluation index name 611, a category name 612, information used for calculating the evaluation index (hereinafter referred to as "evaluation index calculation information 613."), and a basic logic 614.

An evaluation index name is set in the evaluation index name 611. In the present example, "number of trains," "cumulative travel distance of all vehicles," and "track occupancy rate of base" are set. The category name to which the evaluation index belongs is set in the category name 612. In the present example, "transport service" and "vehicle maintenance" are set.

Information used for calculating the evaluation index is set in the evaluation index calculation information 613. In the present example, the information used in the calculation of the evaluation index can be set from the viewpoint of an object (What) 6131, time (When) 6132, and a location (Where) 6133. In the present example, from the viewpoint of the object (What) 6131, "pre-change train timetable," "post-change train timetable," "pre-change vehicle management information," "post-change vehicle management information," "pre-change yard switching plan," and "post-change yard switching plan" are set. Further, "user-specified range" is set as the viewpoint of the time (When) 6132. Further, as the viewpoint of the location (Where) 6133, "all stations" and "all yard tracks" are designated.

In the basic logic 614, information for specifying the basic logic and link information to the substance of the basic logic managed as the evaluation index calculation basic logic 113 are set. In the present example, "deviation calculation," "count of number of trains," "count of number of vehicles," "kilometrage calculation," and "stop time calculation" are set as information for specifying the basic logic.

FIG. 7 is a flowchart illustrating a process performed by the evaluation information setting section 160 when the user operates the extraction executing button 515 of the setting target information input field 510 on the evaluation index setting screen 500 illustrated in FIG. 5 (hereinafter, referred to as a "similar evaluation index extraction process S700."). Hereinafter, the similar evaluation index extraction process S700 will be described with reference to FIG. 7. Incidentally, at the start of the similar evaluation index extraction process S700, it is assumed that the registered evaluation information TBL 111 includes one or more pieces of evaluation information.

First, the setting target information acquiring section 161 acquires setting target information (evaluation index name, category name, time (When), location (Where)) set by the user on the setting target information input field 510 (S711).

Next, the similar evaluation information extracting section 163 selects one entry (evaluation index) from the registered evaluation information TBL 111 (S712).

Then, the similarity degree calculating section 162 acquires the similarity degree between the setting target information (evaluation index name, category name, time (When), location (Where)) acquired in S711 and the evaluation information which is currently selected (hereinafter, referred to as "currently selected evaluation information.") (S713). For example, the similarity degree calculating section 162 derives the above similarity degree by applying each of the following algorithms (1) to (5) under the "or condition."

(1) When the currently selected evaluation index includes a word having the same meaning as that of the word included in the evaluation index name of the setting target information, the number of words having the same meaning is added to the degree of similarity.

(2) When the currently selected evaluation index includes a word having the same meaning as that of the word included in the object (What) of the setting target information, the number of words having the same meaning is added to the degree of similarity.

(3) When the category to which the currently selected evaluation index belongs agrees with the category of the setting target information, 1 is added to the similarity degree.

(4) When the time (When) of the currently selected evaluation index agrees with the time (When) of the setting target information, 1 is added to the similarity degree.

(5) When the location (Where) of the currently selected evaluation index agrees with the location (Where) of the setting target information, 1 is added to the similarity degree.

It should be noted that, in algorithms (1) and (2), the number of words of "synonymous words" is added to the degree of similarity, but the range of "synonymous" may be made adjustable by the user via the UI processing section 130. Further, in algorithms (3) to (5), it is determined "whether or not" the category, the time (When), and the location (Where) of the currently selected evaluation index "agree with" the category, the time (When), and the location (Where) of the setting target information, respectively, but the degree of coincidence may be made adjustable by the user via the UI processing section 130.

Further, in the algorithm (2), the similarity degree calculating section 162 may be configured to derive the similarity degree after setting a weight according to the characteristics of the route that is an object of the vehicle operation plan, for example. In this case, the similarity degree calculating section 162 acquires the above weight from the similarity degree calculation weighting TBL 112. Moreover, the similarity degree calculating section 162 acquires the characteristics of the route that is the object of the vehicle operation plan from, for example, another information processing device that is a component of the traffic control system 1 such as the vehicle operation management device 3. In this way, the similarity degree calculating section 162 calculates the similarity degree in consideration of the weight according to the characteristics of the route, so that the evaluation information used for the evaluation of the vehicle operation plan of the route having similar characteristics can be selected as similar evaluation information, and more appropriate similar evaluation information can be presented to the user as information to be used for setting the evaluation information.

FIG. 8 illustrates an example of the similarity degree calculation weighting TBL 112. The illustrated similarity degree calculation weighting TBL 112 includes one or more entries (records) having each of items, namely, a route characteristic 811, an evaluation index 812, and a weight value 813. Among the above items, information indicating the characteristics of the route (in the present example, "mutual through service operation" and "high-density service") is set in the route characteristic 811. An evaluation index name of a weighting target is set in the evaluation index 812. A weight value corresponding to the characteristics of the route is set in the weight value 813. The content of the similarity degree calculation weighting TBL 112 is set by the user via the UI processing section 130, for example.

An example of calculating the similarity degree by the similarity degree calculating section 162 is illustrated. For example, in the setting target information acquired in S711, in a case where the evaluation index name is "base operation rate," the category name is "vehicle maintenance," the time (When) is "range specification," and the location (Where) is "range specification" and where the characteristic of the route that is the object of the vehicle operation plan is "high-density route," the similarity degree calculating section 162 derives the similarity degree as follows, for example. That is, for example, the similarity degree calculating section 162 finds the similarity degree to the currently selected evaluation index whose evaluation index name is "number of trains" to be "0×2(weight value)+0+1+1=2." Further, for example, the similarity degree calculating section 162 finds the similarity degree to the currently selected evaluation index whose evaluation index name is "cumulative travel distance of all vehicles" to be "0+1+1+1=3." Still further, for example, the similarity degree calculating section 162 finds the similarity degree to the currently selected evaluation index whose evaluation index name is "track occupancy rate of base" to be "1+1+1+1=4."

Returning to FIG. 7, the similar evaluation information extracting section 163 subsequently determines whether or not the similarity degree derived in S713 is equal to or higher than the above-mentioned threshold value (S714). When the similarity degree is equal to or higher than the threshold value (S714: YES), the similar evaluation information extracting section 163 extracts and stores the currently selected evaluation information as similar evaluation information (for example, stores the information in the main storage device 12 or a temporary file) (S715). After that, the process proceeds to S716. On the other hand, when the similarity degree is less than the threshold value (S714: NO), the process proceeds to S716.

In S716, the similar evaluation information extracting section 163 determines whether or not all pieces of the evaluation information of the registered evaluation information TBL 111 have been selected in S712. When all the pieces of evaluation information have not been selected (S716: NO), the process returns to S712. When all the pieces of evaluation information have been selected (S716: YES), the similar evaluation index extraction process S700 ends.

As described in detail above, the assistance device 100 of the present embodiment extracts similar evaluation information from the registered evaluation information TBL 111 on the basis of the setting target information received from the user, and receives settings of evaluation information from the user while presenting the extracted similar evaluation information to the user, thereby generating evaluation information based on a received content. Therefore, the user can efficiently set the evaluation information. In particular, when the evaluation information is not registered, the user can efficiently set the evaluation information having appropriate contents, by using the similar evaluation information presented by the assistance device 100.

Although the embodiments of the present invention have been described above, the present invention is not limited to the above-described embodiments, and includes various modifications. Further, for example, in the above-described embodiments, configurations are described in detail in order to describe the present invention in an easy-to-understand manner, and is not necessarily limited to the one including all the described configurations. Further, addition, deletion, or replacement of a part of the configuration of each embodiment can be carried out to or with other configurations.

Further, some or all of each of the above configurations, functions, processing sections, processing devices, and the like may be achieved by hardware by designing those with an integrated circuit, for example. Moreover, those can also be achieved by a program code of software that fulfills each function illustrated in the embodiments. In this case, the storage medium in which the program code is recorded is provided to the information processing device (computer), and the processor included in the information processing device reads out the program code stored in the storage medium. In this case, the program code itself read from the storage medium fulfills the functions of the above embodiments, and the program code itself and the storage medium storing the program code constitute the present invention. As the storage medium for supplying such a program code, a hard disc, an SSD (Solid State Drive), an optical disc, a magneto-optical disc, a CD-R, a flexible disc, a CD-ROM, a DVD-ROM, a magnetic tape, a non-volatile memory card, a ROM, and the like are used, for example.

In the above embodiments, the control lines and information lines which are considered necessary for explanation are shown and all the control lines and information lines are not necessarily shown in the product. All configurations may be interconnected. In addition, various kinds of information are illustrated in a tabular format in the above, but these pieces of information may be managed in a format other than the tabular format.

In the above embodiments, the vehicle is assumed to be a railroad vehicle, but the present invention can also be applied to a traffic control system for vehicles other than railroad vehicles, which has a configuration similar to that of the traffic control system 1 of the present embodiments.

DESCRIPTION OF REFERENCE CHARACTERS

1: Traffic control system
2: Train operation management device
3: Vehicle operation management device
4: Vehicle allocation management device
5: Yard operation management device
50: Communication network
110: Storage section
111: Registered evaluation information TBL
112: Similarity degree calculation weighting TBL
113: Evaluation index calculation basic logic
114: Information source
115: Train timetable information
116: Vehicle operation information
117: Vehicle allocation information
118: Yard operation information
120: Data acquiring section
130: UI processing section
140: Vehicle operation planning section
150: Evaluation information management section
160: Evaluation information setting section
161: Setting target information acquiring section
162: Similarity degree calculating section
163: Similar evaluation information extracting section
164: Evaluation information generating section
400: Vehicle operation planning screen
500: Evaluation index setting screen
S700: Similar evaluation index extraction process

The invention claimed is:

1. A vehicle operation assistance system comprising:
a user interface;
a vehicle operation plan creation button;
a display content switching button;
a user interface, which is configured to receive user inputs and display outputs; and
a vehicle operation assistance device configured by using an information processing device, the vehicle operation assistance device comprising:
an evaluation information management section that manages one or more pieces of evaluation information including information regarding evaluation of a vehicle operation plan;
a setting target information acquiring section that acquires setting target information that is information regarding evaluation, the information being intended to be set for the vehicle operation plan by a user;
a similarity degree calculating section that derives a similarity degree between the setting target information and each of the one or more pieces of evaluation information;
a similar evaluation information extracting section that extracts the evaluation information on a basis of the similarity degree; and an evaluation information generating section that receives a setting of information regarding the evaluation of the vehicle operation plan from the user while presenting similar evaluation information that is the extracted evaluation information to the user, and generates evaluation information based on a received content, wherein
the evaluation information includes information regarding an evaluation index used for the evaluation of the vehicle operation plan and information regarding a calculation method of the evaluation index, and
the evaluation information is displayed to the user via the user interface,
the user interface includes a planning region and an evaluation region, and
the interface is configured such that when the user operates the vehicle operation plan creation button a screen is displayed to set the vehicle operation plan, and when the user operates the display content switching button content display is switchable between a current vehicle operation plan and a new vehicle operation plan.

2. The vehicle operation assistance system according to claim 1, wherein
the user interface visually presents the calculation method of the evaluation index included in the similar evaluation information, in a state in which the user can edit the method.

3. The vehicle operation assistance system according to claim 2, wherein
the user interface displays an image or a character string for specifying one or more information sources that can be used for editing the calculation method of the evaluation index, or an image or a character string specifying one or more logics that can be used for the editing, and provides to the user an environment for editing the calculation method of the evaluation index by performing an operation on the image or the character string.

4. The vehicle operation assistance system according to claim 1, wherein
the evaluation information includes
an evaluation index name that is a name of an evaluation index used for the evaluation of the vehicle operation plan,
a category name that is a name of a category to which the evaluation index belongs,
information indicating time to be evaluated by the evaluation information, and information indicating a location to be evaluated by the evaluation information.

5. The vehicle operation assistance system according to claim 4, wherein
the setting target information acquiring section receives, from the user, the evaluation index name, the category name, the information indicating the time to be evaluated, and the information specifying the location to be evaluated as the setting target information, and
the similarity degree calculating section compares the setting target information with the evaluation information, and determines the similarity degree on a basis of at least any one of a degree of coincidence between the evaluation index names, a degree of coincidence between the categories, a degree of coincidence between the time to be evaluated, and a degree of coincidence between the locations to be evaluated.

6. The vehicle operation assistance system according to claim 5, wherein
the similarity degree calculating section derives the similarity degree after setting a weight according to a characteristic of a route that is an object of the vehicle operation plan to the evaluation index name of the evaluation index affected by the characteristic of the route.

7. The vehicle operation assistance system according to claim 1, wherein
the similar evaluation information extracting section extracts the evaluation information whose similarity degree is equal to or higher than a preset threshold value as the similar evaluation information.

8. The vehicle operation assistance system according to claim 1, wherein
the evaluation index is derived based on information obtained by executing a simulation for at least any one of a train timetable plan, a vehicle operation plan, a vehicle allocation plan, and a yard operation plan.

9. The vehicle operation assistance device according to claim 1, wherein
the vehicle operation assistance device transmits a timetable correction plan based on the evaluation information to a vehicle operation management device.

10. A vehicle operation assistance method executed by an information processing device, the method comprising:
a user interface;
providing a vehicle operation plan creation button;
providing a display content switching button;
a step of providing a user interface, which is configured to receive user inputs and display outputs;
a step of managing one or more pieces of evaluation information including information regarding evaluation of a vehicle operation plan;
a step of acquiring setting target information that is information regarding evaluation, the information being intended to be set for the vehicle operation plan by a user;
a step of deriving a similarity degree between the setting target information and each of the one or more pieces of evaluation information;
a step of extracting the evaluation information on a basis of the similarity degree;
a step of receiving a setting of information regarding the evaluation of the vehicle operation plan from the user while presenting similar evaluation information that is the extracted evaluation information to the user, and generating evaluation information on a basis of a received content, wherein
the evaluation information includes information regarding an evaluation index used for the evaluation of the vehicle operation plan and information regarding a calculation method of the evaluation index,
the user interface includes a planning region and an evaluation region;
a step of, when the user operates the vehicle operation plan creation, displaying a screen to set the vehicle operation plan; and
a step of, when the user operates the display content switching button, switching displayed content between a current vehicle operation plan and a new vehicle operation plan.

11. The vehicle operation assistance method according to claim 10, further comprising
a step of transmitting a timetable correction plan based on the evaluation information to a vehicle operation management device.

* * * * *